April 5, 1955      E. JOHNISEE      2,705,475
ANIMAL SURGERY BENCH
Filed Dec. 4, 1953
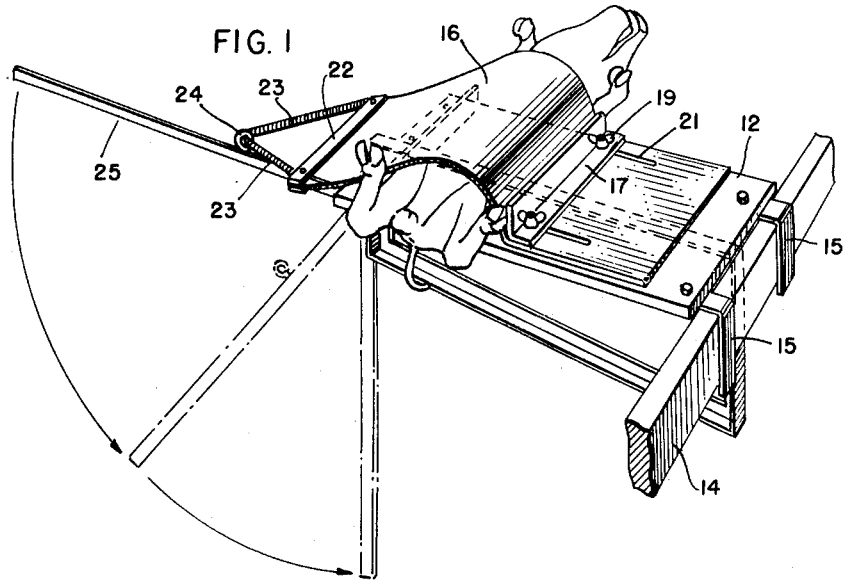
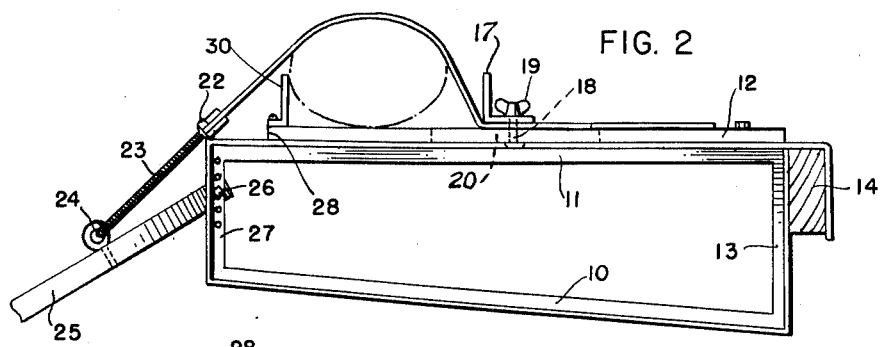
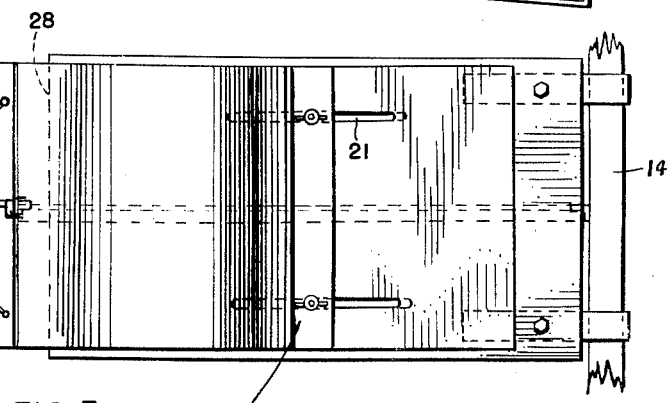
INVENTOR:
EMERT JOHNISEE
BY
ATT'YS

United States Patent Office 2,705,475
Patented Apr. 5, 1955

2,705,475

ANIMAL SURGERY BENCH

Emert Johnisee, Eldred, Ill.

Application December 4, 1953, Serial No. 396,216

5 Claims. (Cl. 119—103)

This invention relates to bench structures adapted for use in performing minor surgical operations on small animals, as for example, pigs, and which is particularly designed for convenient field use.

The main objects of this invention are to provide an animal surgery bench that is adapted to be readily attached and detached from a horizontal fence rail, and that is capable of restraining movement of the animal during a surgical operation, such as is usually performed by the farmer; to provide such a bench that is light in structure and that can be conveniently carried from place to place and quickly mounted on existing fence rails of different pens.

A hog farmer, to have a good herd must castrate and vaccinate the sow's litter within a short time after birth. One of the reasons for doing this in the field is that if the farmer waits too long the pig gets too big to handle readily. To have a practical device for accomplishing this purpose, it is necessary that the device be readily transportable from pigpen to pigpen, preferably by a single person, since it is customary to separate the individual sows and their offspring from other sows and offspring.

A specific embodiment of this invention is shown in the accompanying drawings, in which:

Figure 1 is a perspective view of a surgical bench for restraining small animals, such as pigs, showing the relation of the parts to an animal lying on the platform thereof.

Fig. 2 is a side elevation of the same, illustrating the toggle relation between the operating lever and the animal holding web.

Fig. 3 is a top plan illustrative of the structure.

In the form shown in the drawings, the device comprises a skeleton frame 10 having a horizontal elongated top bar 11 to which is secured a platform 12. The frame has a vertical bar 13 that is adapted to abut against a fence rail 14, which is usually of two by four inches cross section, and the platform has attached thereto a pair of metal straps bent to angle form to provide depending hooks 15 equally spaced at opposite sides of the bar 13, so as to embrace the fence rail 14, as indicated in the drawing, and hold the bench platform 12 in rigid relation to the fence rail.

The platform 12 has mounted thereon a sheet of flexible webbing 16, which may be of rubber, since it preferably should be somewhat resilient as well as flexible, so as to readily adapt itself to some degree to the contour of the animal's body. The web 16 is secured to the platform 12 by means of a cleat 17, which extends transversely across the platform 12 and is adjusted longitudinally thereof, by bolts 18 having wing nuts 19 and extending through slots 20, in the platform, and slots 21 in the web 16. The web 16 has a cleat 22 extending across its free end and this end cleat is connected by a pair of tension springs 23, to an eye 24 on an operating lever 25.

The lever is pivotally connected at 26 to the end bar 27 of the frame 10, which is preferably located somewhat beyond the adjacent end 28 of the platform, so that the lever 25 may swing downwardly far enough by its own weight to cause the springs 23 to pass the pivot 26 in toggle relation to the lever 25. When the lever 25 is allowed to swing downwardly by its own weight, the animal, in the position shown in the drawings, cannot struggle free from the holding grip of the web 16, and is thereby properly restrained for work to be done on it.

When the lever 25 is shifted up above a horizontal position, the web 16 will be raised sufficiently to allow adequate room for placing the animal below it. The web is preferably stiff enough to buckle upward so that the animal can be readily placed under it across the platform and retained thereby allowing the handle 25 to assume the medial position as shown in dotted lines in Fig. 1. It should now be obvious that because the web 16 is flexible and resilient and adapts itself to the contour of the animal's body solely by the weight of the lever 25 and the animal held in restraining position by the weight of said handle 25, no physical harm can be done to the animal by the apparatus as a whole.

The adjustable cleat 17 is placed in such relation to the web and platform as to adapt the length of the web to a particular size of animal to be treated.

Also an angle iron 30 is positioned adjacent the end 28 of platform 12 and bolted thereto, which acts as an adjunct to the web 16 to retain the animal in the inverted position shown in Figs. 1 and 2.

Although but one specific embodiment of this invention is herein shown and described, it will be understood that numerous details of the construction shown may be altered or omitted without departing from the spirit of the invention as defined by the following claims.

I claim:

1. An animal surgery bench, comprising a bracket frame, having a hook at one end adapted to mount said frame in a transversely extended horizontal position on a fence rail, a platform on said frame, a flexible web on top of said platform of a width substantially equal to the width of said platform and having one end secured to said platform along a line substantially parallel with such fence rail and having a free portion, a lever pivoted on said frame to swing in a vertical plane, and a tension spring interposed between said lever and the free end of said web.

2. An animal surgery bench, comprising a bracket frame, having a hook at one end adapted to mount said frame in a transversely extended horizontal position on a fence rail, a platform on said frame, a flexible web on top of said platform, a cleat adjustable along said web to secure it to said platform intermediate of the ends thereof, a cleat at the free end of said web, a lever pivoted on said frame adjacent the end of said platform that is remote from said hook, and a tension spring connecting the free end of said web to said lever.

3. An animal surgery bench, comprising a bracket frame, having a hook at one end adapted to mount said frame in a transversely extended horizontal position on a fence rail, a platform on said frame, a flexible web on top of said platform, a cleat adjustable along said web to secure it to said platform intermediate of the ends thereof, a cleat at the free end of said web, a lever pivoted on said frame adjacent the end of said platform that is remote from said hook, and a tension spring connecting the free end of said web to said lever in toggle relation to the pivotal axis of said lever.

4. An animal surgery bench, comprising a bracket frame, having a hook at one end adapted to mount said frame in a transversely extended horizontal position on a fence rail, a platform on said frame, a flexible web on top of said platform, a cleat adjustable along said web to secure it to said platform intermediate of the ends thereof, a cleat at the free end of said web, a lever pivoted on said frame adjacent the end of said platform that is remote from said hook, and a pair of springs attached to said lever at a point spaced from its pivotal axis and connected to said web end cleat adjacent the opposite ends thereof.

5. An animal surgery bench, comprising a bracket frame, having a hook at one end adapted to mount said frame in a transversely extended horizontal position on a fence rail, a platform on said frame, a flexible web on top of said platform, a cleat adjustable along said web to secure it to said platform intermediate of the ends thereof, a cleat at the free end of said web, a lever pivoted on said frame adjacent the end of said platform that is remote from said hook, and a pair of springs attached to said lever at a point spaced from its pivotal axis and connected to said web end cleat adjacent the opposite ends thereof, said pivotal axis being located outward from the end of said platform to permit said springs to pass said axis in toggle relation to said lever.

References Cited in the file of this patent

UNITED STATES PATENTS

| | | |
|---|---|---|
| 1,487,941 | Hammett | Mar. 25, 1924 |
| 1,842,015 | Finson | Jan. 19, 1932 |